United States Patent [19]

Anderson et al.

[11] Patent Number: 5,074,030

[45] Date of Patent: Dec. 24, 1991

[54] PRESS AND MODULAR PRESS BLOCK FOR ELECTRICAL CONNECTOR APPLICATION TOOLING

[75] Inventors: Daniel J. Anderson, Elmhurst; Robert A. Klemmer, Wheeling, both of Ill.

[73] Assignee: Molex Incorporated, Lisle, Ill.

[21] Appl. No.: 606,983

[22] Filed: Oct. 31, 1990

[51] Int. Cl.[5] .............................................. B23P 19/00

[52] U.S. Cl. .......................................... 29/739; 29/741; 29/845

[58] Field of Search ................. 29/739, 741, 747, 844, 29/845

[56] References Cited

U.S. PATENT DOCUMENTS

| | | | |
|---|---|---|---|
| 3,812,569 | 5/1974 | Kufner et al. | 29/739 |
| 4,394,795 | 7/1983 | Goss | 29/739 |
| 4,451,975 | 6/1984 | Baccei | 29/705 |
| 4,467,523 | 8/1984 | Chisholm | 29/845 |
| 4,503,610 | 3/1985 | Resch | 29/739 |
| 4,553,322 | 11/1985 | Cappos et al. | 29/739 |
| 4,555,847 | 12/1985 | Dornes et al. | 29/739 |
| 4,573,262 | 3/1986 | Dornes et al. | 29/739 |
| 4,590,673 | 5/1986 | Dornes et al. | 29/845 |
| 4,598,471 | 7/1986 | Elsbree, Jr. et al. | 29/845 |
| 4,612,700 | 9/1986 | Loomis et al. | 29/564.6 |
| 4,631,817 | 12/1986 | Bailey et al. | 29/747 |
| 4,763,400 | 8/1988 | Deckers | 29/564.6 |
| 4,763,412 | 8/1988 | Basvanhally et al. | 29/845 |
| 4,969,258 | 11/1990 | Fisher et al. | 29/739 |

OTHER PUBLICATIONS

Hudson, G. D., Powell, L. D., Guide Assembly for Pin-Insertion Press Blocks, Western Electric Tech. Digest, Jan. 1981, pp. 13-14.

*Primary Examiner*—P. W. Echols
*Attorney, Agent, or Firm*—Louis A. Hecht; Stephen Z. Weiss; Charles S. Cohen

[57] ABSTRACT

A modular press block assembly for use in a press tool to mount an electrical connector assembly having a housing and depending terminal pins into a printed circuit board. The modular press block assembly includes a pair of end holders and at least one modular press block positioned between the end holders for engaging the connector assembly and pressing the terminals into the printed circuit board. The invention contemplates a plurality of the modular press blocks of different sizes to form a set thereof for accommodating a plurality of different sizes of connector assemblies. Complementary interengaging keys are provided between the end holders and the modular press blocks and between the press blocks themselves to define proper positioning of the press blocks between the end holders and to maintain that positioning when the end holders are held against the sides of the press block. Spacer blocks also can be used between adjacent press blocks. Tie rods span the end holders to hold the end holders against the sides of the outermost press blocks. The tie rods are located outside the bounds of the press blocks whereby the press blocks can be located between the end holders without removing the tie rods.

29 Claims, 2 Drawing Sheets

PRESS AND MODULAR PRESS BLOCK FOR ELECTRICAL CONNECTOR APPLICATION TOOLING

FIELD OF THE INVENTION

This invention generally relates to the art of application tooling for mounting an electrical connector into a printed circuit board and, particularly, to a press tool and a modular press block assembly.

BACKGROUND OF THE INVENTION

Various electrical connectors include an insulating body for housing a plurality of closely spaced terminals with terminal pins depending from the housing to be inserted into holes in a printed circuit board. The holes may be plated with an electrically conductive material to establish an electrical connection with the terminal pins. In such instances, it is desirable that the posts establish a tight fit in the printed circuit board. Other terminals have solder pins inserted into the printed circuit board holes for soldering to circuit traces on the board.

Such connectors have a plurality of terminals, and the force needed to insert all of the terminals into all of the printed circuit boards often is more than can be accomplished manually in an efficient and cost effective manner. Manual insertion must involve inserting individual terminals, because, in many instances, simultaneous insertion of the terminals into the printed circuit board can require hundreds of pounds and even exceeding a 1000 pounds. Consequently, mass production or assembly of electrical connectors of the character described have required presses to perform the terminal insertion function.

Typically, a press includes a platen for receiving the printed circuit board, and the platen and board are positioned under a ram of the press. Press blocks are interposed between the connector and the press ram, the press blocks engaging terminal ends of the terminals to press the pin ends of the terminals, along with the connector housing, toward the printed circuit board and driving the terminal pins through the holes in the board. An example of a press head or ram is shown in Cappos et al U.S. Pat. No. 4,553,322, dated Nov. 19, 1985, and an example of a press block assembly is shown in Goss U.S. Pat. No. 4,394,795, dated July 26, 1983.

There are a number of problems in designing presses and press block assemblies of the character described. One problem involves the positioning and holding of the connector on the printed circuit board to prevent the connector from twisting or tilting during the pressing operation, which could damage, break or bend the terminal pins. This invention is directed to solving this problem by providing an improved locator plate positionable on top of the printed circuit board for locating the connector housings and maintaining the housings in proper orientation.

Another and significant problem involves the design of the press blocks themselves which engage the terminal pins and/or connector housing to press the pins into the holes in the printed circuit board. Typically, the press blocks are manually assembled. Heretofore, known press block assemblies are very cumbersome and require the entire assembly to be dismantled for a given connector application. In other words, connectors can vary in size and shape and the press block assemblies must be of a similar size. Therefore, either a considerable inventory of press blocks must be maintained, or modular press block assemblies are used and which can be assembled in different sizes by adding or subtracting block modules, such as shown in the aforesaid 4,394,795 patent. The press block assembly of that patent is difficult to dismantle and reassemble because of its multiple component design and the use of individual push pins for engaging the terminal pins.

This invention is directed to providing a considerably more simplified and easily used press block assembly than has heretofore been available.

SUMMARY OF THE INVENTION

An object, therefore, of the invention is to provide a new and improved modular press block assembly for use in a press tool for mounting an electrical connector assembly into a printed circuit board.

Another object of the invention is to provide an improved locator plate for use in a press assembly of the character described.

In the exemplary embodiment of the invention, the electrical connector assembly includes a housing and depending terminal pins for pressing into holes in a printed circuit board. The modular press block assembly of the invention includes a pair of end holders, such as end blocks having inwardly facing abutment surfaces. At least one modular press block is positioned between the inwardly facing abutment surfaces of the end holders for engaging the connector assembly and pressing the terminals into the printed circuit board. Complementary interengaging key means are provided between the inwardly facing abutment surfaces of the end holders and the sides of the modular press block to define proper positioning of the press block between the end holders and to maintain that positioning when the end holders are held against the sides of the press block. Readily releasable tie means span the end holders to hold the end holders against the sides of the press block.

Preferably, the tie means are located outside the bounds of the modular press block whereby the press block can be located between the end holders without removing or dismantling the tie means. This considerably facilitates manual assembly of the modular press block assembly.

The invention contemplates providing a plurality of the modular press blocks of different sizes to form a set or sets thereof to accommodate a plurality of different sized connector assemblies. The modular press blocks are positioned in a side-by-side relationship between the end holders, and the complementary interengaging key means on the end holders and all of the modular press blocks of the set are of uniform configurations.

The invention also contemplates at least one spacer block positionable between a pair of modular press blocks, the spacer block(s) also including the complementary interengaging key means.

In contrast to prior press pins for engaging the terminal pins as is predominant in the prior art, the invention contemplates that the modular press blocks include through holes for receiving terminal ends of the terminal pins regardless of the lengths thereof. The terminal pins are provided with outwardly projecting shoulder means, and the through holes in the modular press block are sized so that the press block abuts the shoulder means for pressing the terminal pins into the printed circuit board.

Lastly, the invention contemplates a press assembly including a press head and a platen for receiving a printed circuit board thereon and for positioning beneath the press head. A locator plate is positionable on top of the printed circuit board and has a predetermined pattern of apertures for locating the connector housings. The apertures are sized to prevent the connector housings from rocking or tilting during a pressing operation to avoid breaking or bending the terminal pins.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the following description taken in conjunction with the accompanying drawings, in which like reference numerals identify like elements in the figures and in which:

DETAILED DESCRIPTION OF THE PREFERRED EMBODIMENT

Figure 1:
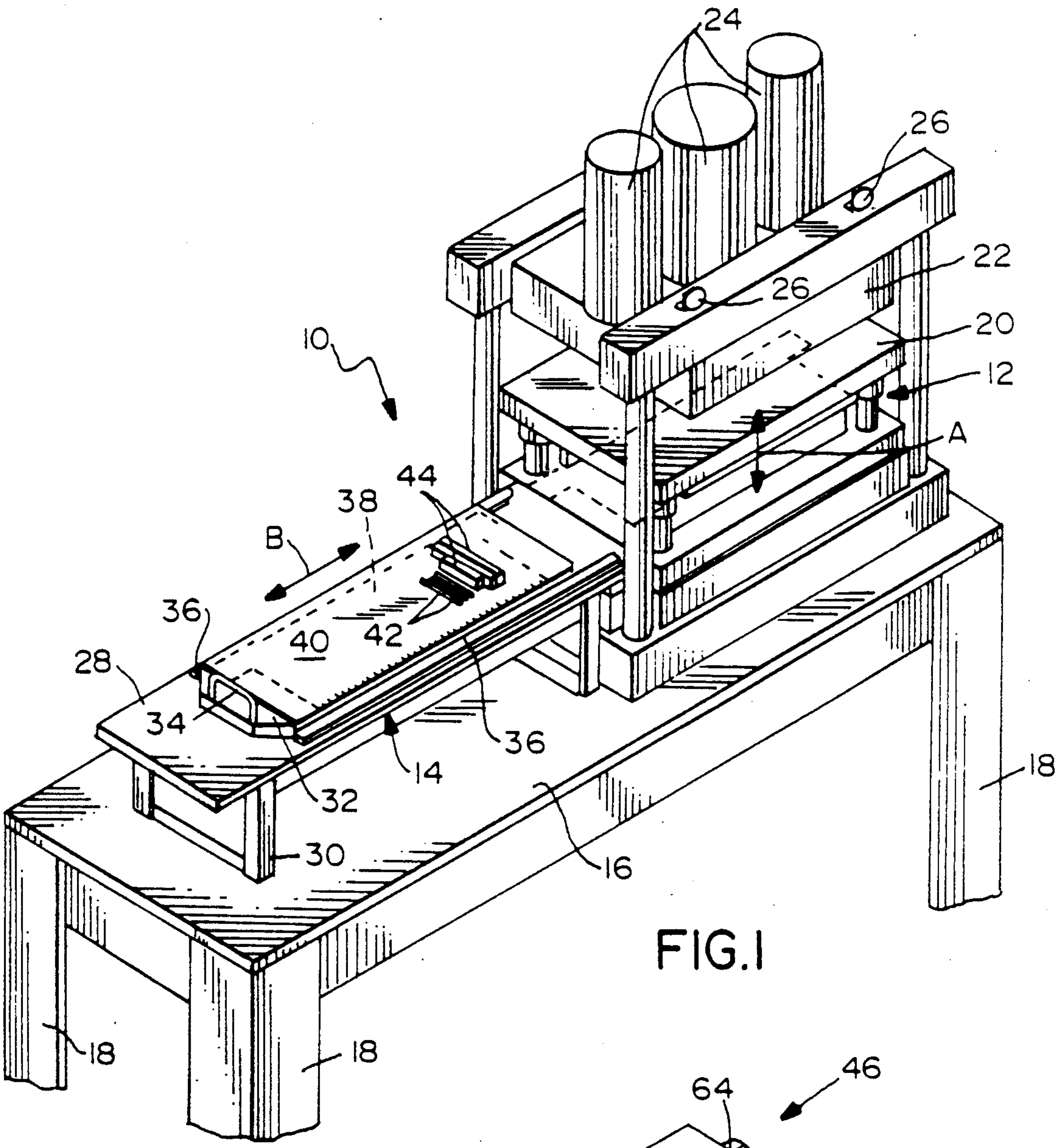
FIG. 1 is a perspective view of a press or application tool incorporating the concepts of the invention.

Referring to the drawings in greater detail and first to FIG. 1, a press or application tool, generally designated 10, is shown of somewhat conventional configuration in that it includes a press station, generally designated 12, and a loading station, generally designated 14. The press includes a platform 16 supported by a base in the form of legs 18. The press includes a planar press plate 20 at press station 12 and which is engaged by a ram 22 vertically reciprocatable in the direction of double-headed arrow "A" by means of cylinders 24 actuated by operating buttons 26, two of which are used for safety purposes.

Press 10 includes an elevated table 28 supported above platform 16 by means of a base 30. A platen 32, including a manually graspable handle 34, is slidable between guide rails 36 toward and away from press station 12, in the direction of double-headed arrow "B", to move a loaded platen from loading station 14 to a position beneath the press ram at press station 12.

Suffice it to say at this point, a printed circuit board 38 is shown by dotted lines in FIG. 1, on top of platen 32 and beneath a locator plate 40. The locator plate has a predetermined array of apertures 42 for locating connector assemblies, generally designated 44. Further structure and operation of the locator plate and the electrical connector assemblies will be described in greater detail hereinafter in conjunction with the modular press block assemblies of the invention, not shown in FIG. 1.

Figure 2:
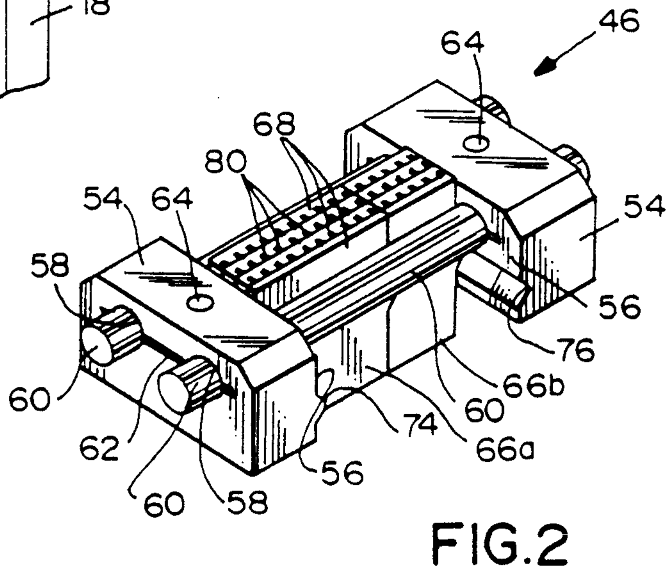
FIG. 2 is a perspective view of a modular press block assembly according to the invention.
Figure 3:
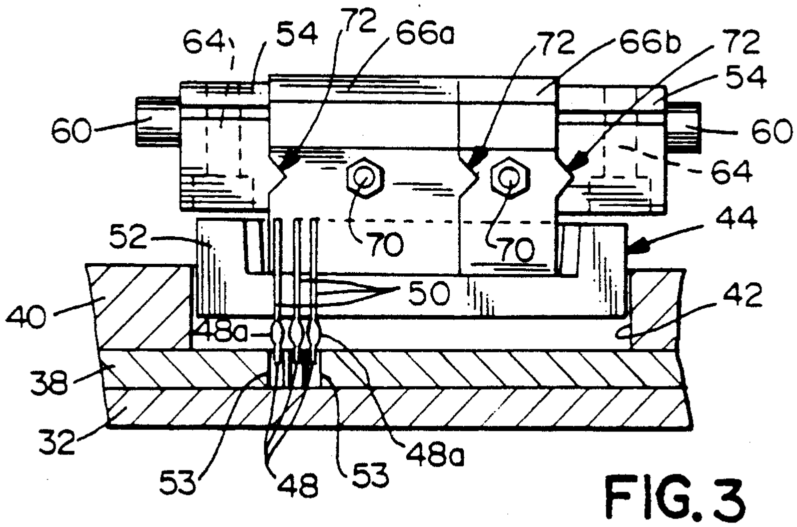
FIG. 3 is a side elevational view of the modular press block assembly of FIG. 2.
Figure 4:
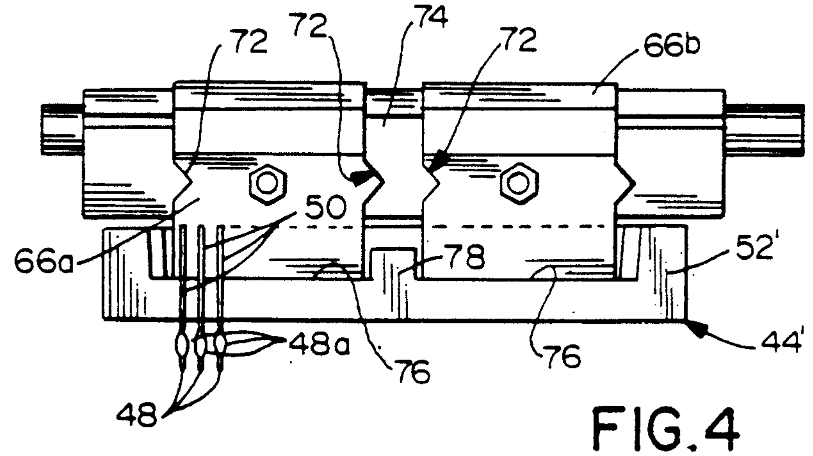
FIG. 4 is a side elevational view, similar to that of FIG. 3, but incorporating a spacer block.

Referring to FIGS. 2-4, the invention contemplates the use of improved modular press block assemblies, generally designated 46, for mounting the electrical connector assemblies 44 to printed circuit board 38 by pressing depending terminal pins 48 of a plurality of terminals 50 into respective holes 53 through printed circuit board 38.

More particularly, referring to FIG. 3, printed circuit board 38 is seen with the distal ends of depending terminal pins 48 slightly positioned within holes 53 in the printed circuit board. The terminal pins may be slightly enlarged, as at **48*a*, to provide a tight fit with the holes. These enlarged portions also allow for the pins to be inserted only partially into the printed circuit board holes in a pre-mounting position as shown in FIG. 3**.

As stated above, printed circuit board 38 is positioned on top of platen 32, as seen in FIG. 3. Locator plate 40 is positioned on top of the printed circuit board, the locator plate having a predetermined array of apertures 42 each sized and shaped for receiving a housing 52 of a particular electrical connector assembly 44. The locator plate should be sufficiently thick to prevent the housing from tilting or rocking during a pressing operation to prevent damage or bending of terminal pins 48, and the size of any given aperture 42 for a given connector housing, accordingly, must be sized to prevent excess movement of the connector housing therein.

The invention contemplates providing one modular press block assembly 46 for each electrical connector assembly 44. The press blocks are the components which actually are engaged by the ram of press 10.

Each modular press block assembly 46 includes a pair of end holders 54 in the form of end blocks having inwardly facing, generally planar abutment surfaces 56. The end blocks have through holes 58 for receiving a pair of tie rods 60 therethrough. A slot 62 (FIG. 2) joins through holes 58, the slot providing an element of resiliency in the body of end blocks 54. To this end, a clamping screw 64 (FIG. 2) is threaded downwardly through each end block 54 and through slot 62. Only the end of the screws are visible in FIG. 2, but it can be understood that by tightening the screws, slots 62 are closed, and the portions of the end blocks above the slots are clamped onto tie rods 60 at any given position therealong.

As seen by dotted lines in FIG. 3, a clamping screw 64 in each end block 54 is provided for tightly fixing the selected position of the end blocks longitudinally of the tie rods 60.

One or more modular press blocks **66*a* and 66*b* are positioned between end blocks 54 of modular press block assembly 46. The width of each press block (i.e. transverse to tie rods 60) is variable in that the press blocks are fabricated in a laminated manner by a plurality of layers 68 held together by bolts 70 (FIG. 3**). Therefore, the press blocks can be assembled, individually, to accommodate electrical connectors having varying numbers of rows of terminal pins.

Complementary interengaging key means are provided between end blocks 54 and modular press blocks **66*a*,66*b* to define proper positioning of the press blocks between the end holders and to maintain that positioning when the end holders are moved toward each other against the sides of the press blocks. More particularly, the key means is shown generally at 72 in FIGS. 3 and 4 between adjacent press blocks 66*a*, 66*b* and between the end-most press blocks and end blocks 54. In the embodiment illustrated in FIGS. 3 and 4, the key means are in the form of transverse, triangularly configured projections and recesses, all of which are of uniform configurations. In other words, as shown in the drawings, the apexes of the triangular configurations all face to the right so that the key means, throughout the assembly longitudinally thereof, are uniform. This facilitates the modular concept of the invention. As to the end blocks 54, FIG. 2 shows this concept by having a triangulated, transverse projection 74 on the left-hand end block pointing toward the right, and the right-hand end block has a transverse triangulated slot 76**, the bottom or apex thereof likewise pointing to the right.

With the uniform key means 72 described above and shown in FIGS. 2–4, the modular press block assembly of the invention is extremely versatile. In particular, it can be seen that press block **66*a* is longer than press block 66*b*. For instance, press block 66*a* may accommodate ten terminal pins in a row longitudinally of connector housing 52 and press block 66*b* may accommodate five terminal pins, the result of which is that the combination of press blocks 66*a* and 66*b* can accommodate an electrical connector which has fifteen terminal pins in each longitudinal row thereof. If two press blocks 66*a* are positioned between end blocks 54, an electrical connector having twenty terminal pins in a row could be accommodated. Likewise, if two press blocks 66*b* are positioned between end blocks 54, an electrical connector having ten terminal pins could be accommodated. In a similar fashion, it is the intent of this invention that a complete set or sets of different sized press blocks be provided to accommodate varying numbers of terminal pins longitudinally of any connector assembly. For instance, one press block could accommodate nine terminal pins and a second press block could accommodate two terminal pins, the press blocks combining to accommodate an electrical connector having eleven terminal pins in each row. Without going further, it can be seen that a variety of different sized press blocks can be provided to accommodate practically any electrical connector configuration, all of the press blocks having the uniform key means 72 described above. Of course, it is understood that tie rods 60** must be of sufficient length to accommodate a range of different sized press blocks assembled side-by-side (or end-to-end) within an expected range of electrical connector assemblies which are to be used with a given printed circuit board for assembling in the press tool.

FIG. 4 illustrates another feature of the invention wherein a single press block assembly 46 can be adjusted by means of a spacer block 74 between a pair of press blocks, such as a pair of identical press blocks **66*a*. This spacer can be used for what are commonly termed "two bay" connectors having clusters of terminal pins that are separated. In this instance, each cluster would have ten terminal pins in each longitudinal row thereof in two bays 76, separated by a partition 78 of a housing 52′ of an electrical connector assembly 44′. Again, the spacer has the identical or uniform key means 72 for interengaging with press blocks 66*a* on opposite sides of the spacer block. Of course, a set of different sized spacer blocks also are contemplated, and press blocks 66*a* (FIG. 4) may be of different sizes depending upon the configuration of electrical connector assembly 44**.

Figure 5:
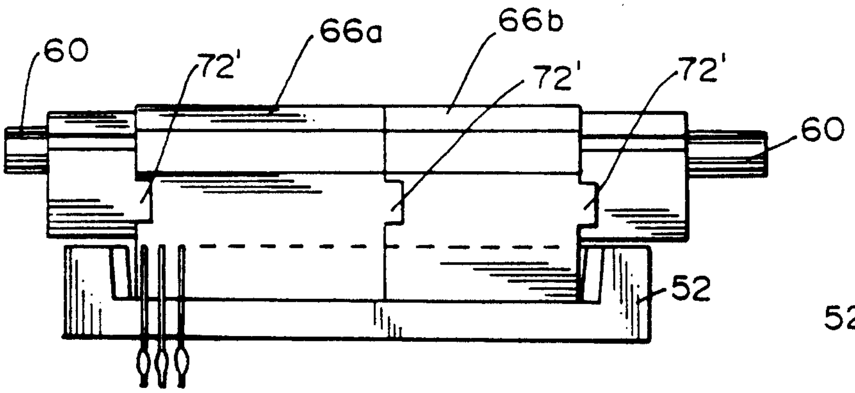
FIG. 5 is a side elevational view, similar to that of FIG. 3, but showing a modified form of key means.

FIG. 5 is substantially identical to FIG. 3, but this depiction illustrates a different configuration of key means 72′ in comparison to key means 72 in FIGS. 2–4. Specifically, key means 72′ are of a rectangular configuration versus the triangular configuration of key means 72. Regardless, it can be seen that rectangular key means 72′ all are uniform and commonly directionally oriented lengthwise of the press block assembly to facilitate the modular concept of the invention.

Figure 6:
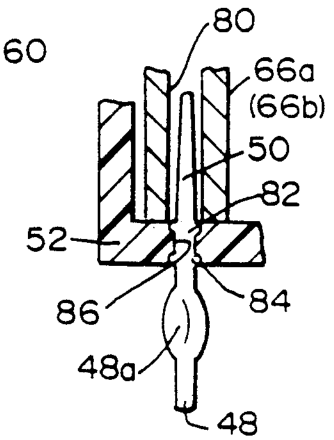
FIG. 6 is a fragmented section through a portion of a press block and a connector assembly, illustrating the engagement of the press block with one of the terminal pins of the connector assembly.

Still a further feature of the invention is shown in FIG. 6 wherein, contrary to the use of press pins as is predominant in the prior art, the invention contemplates that the press blocks have through holes 80 which also are visible in FIG. 2. One through hole is provided for each terminal 50, and each terminal 50 is fabricated with an outwardly projecting shoulder 82. The through holes are sized, in cross-section, so that the press block abuts the shoulders of the terminals, as seen in FIG. 6, for pressing the terminal pins into the holes in the printed circuit board, and driving housing 52 of connector assembly 44 into mounting position on top of the printed circuit board. To that end, the terminal pins have staking flanges 84 within through holes 86 in housing 52. By providing through holes in the press blocks, a variety of terminal pins having different lengths of terminal ends extending into the through holes can be accommodated. In fact, a single connector assembly could have terminals of different length terminal ends in the different rows of terminals of the connector assembly.

The general overall operation of the features of this invention now will be described. First, terminal pins 50 are staked or preassembled into the respective housings 52 of connector assembly or assemblies 44. The number of different connector assemblies, along with their sizes, shapes and other configurations, of course, will be determined by the particular circuitry desired on printed circuit board 38. Locator plate 40 is provided with a predetermined array of apertures 42, again according to the printed circuit board circuitry and the resulting array of electrical connectors to be mounted thereon. Already, it can be seen and understood that practically an infinite variety of circuitry and connector combinations and arrays are possible depending upon the particular application demand. The unique modular press block assembly concepts and features of the invention obviously come into play at this point in that a press block assembly must be configured in a given combination for each electrical connector assembly to be mounted on the printed circuit board. Once determined, a press block assembly is manually assembled for each electrical connector. By providing a set of press blocks of different sizes, this determination is very simple.

Then, with one of the end blocks 54 loosened by means of clamp screws 64 and set screws 66, the now determined number and sizes of press blocks are positioned between the end blocks of the press block assemblies. The loosened end block is moved toward the opposite end block to sandwich the press blocks therebetween, and the loosened end block is tightened. It readily is apparent that this procedure easily can be accomplished by manual manipulation by two hands of an operator, particularly because of the novel key means of the invention which positions and maintains the positioning of the press blocks between the end blocks. An operator actually can orient the assembly in a vertical orientation, hold the end blocks separated by his fingers, drop the press blocks into place, and tighten the assembly, as described, with his other hand, in a matter of seconds. With tie rods 60 being outside the bounds of the press blocks, and independently functional in relation thereto, the entire assembly never needs to be dismantled or disassembled. The end blocks only need to be loosened relative to each other to afford ample room for fast positioning of the press blocks therebetween and then retightened.

Once all of the modular press block assemblies 46 are assembled in various sizes or configurations for the respective connectors, the press blocks are positioned onto the connectors as shown in FIG. 3, engaging shoulders 82 of terminals 50 as shown in FIG. 6, and the entire assembly of platen 32, printed circuit board 38, locator plate 40, electrical connector assemblies 44 and press block assemblies 46 are moved from loading station 14 (FIG. 1) into press station 12, and mass production can proceed with the press block assemblies continuously usable for mass runs of a given printed circuit board configuration.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. For use in a press tool for mounting an electrical connector assembly having a housing and depending terminal pins into a printed circuit board, a modular press block assembly comprising:

- a pair of end holders;
- at least one modular press block positioned between the end holders for engaging the connector assembly and pressing the terminals into the printed circuit board;
- complementary interengaging key means between the end holders and the modular press block to define proper positioning of the modular press block between the end holders and to maintain said positioning when the end holders are held against sides of the press block; and
- tie means spanning the end holders to hold the end holders against the sides of the press block.

2. The modular press block assembly of claim 1 wherein said end holders comprise end blocks having inwardly facing abutment surfaces for engaging the sides of the modular press block.

3. The modular press block assembly of claim 2 wherein said complementary interengaging key means are located between said inwardly facing abutment surfaces of the end blocks and the sides of the modular press block.

4. The modular press block assembly of claim 1 wherein said modular press block includes through holes for receiving terminal ends of said terminal pins regardless of the length thereof.

5. The modular press block assembly of claim 4 wherein said terminal pins are provided with outwardly projecting shoulder means, and the through holes in the modular press block are sized so that the press block abuts said shoulder means for pressing the terminal pins into the printed circuit board.

6. The modular press block assembly of claim 1 wherein said modular press block includes outwardly facing side abutment faces having the complementary interengaging key means thereon.

7. The modular press block assembly of claim 1, including a plurality of said modular press blocks for positioning in a side-by-side relationship between the end holders.

8. The modular press block assembly of claim 7 wherein said complementary interengaging key means are located on side faces of the modular press blocks.

9. The modular press block assembly of claim 8 wherein said complementary interengaging key means on the end holders and the modular press blocks are of uniform configurations.

10. The modular press block assembly of claim 1, including a plurality of said modular press blocks of different sizes to form a set thereof for accommodating a plurality of different sized connector assemblies.

11. The modular press block assembly of claim 1 wherein said tie means are of sufficient length to accommodate a plurality of modular press blocks between the end holders.

12. The modular press block assembly of claim 11, including at least one spacer block positionable between a pair of modular press blocks and including said complementary interengaging key means.

13. The modular press block assembly of claim 1 wherein said tie means are located outside the bounds of the modular press block whereby the press block can be located between the end holders without removing the tie means.

14. For use in a press tool for mounting an electrical connector assembly having a housing and depending terminal pins into a printed circuit board, a modular press block assembly comprising:

- a pair of end blocks having inwardly facing abutment surfaces;
- at least one modular press block positioned between the end blocks for engaging the connector assembly and pressing the terminals into the printed circuit board, the press block having outwardly facing side abutment faces;
- complementary interengaging key means between the inwardly facing abutment surfaces of the end blocks and the side abutment faces of the modular press block to define proper positioning of the modular press block between the end blocks and to maintain said positioning when the end blocks are held against sides of the press block; and
- tie means spanning the end blocks outside the bounds of the modular press block to hold the end blocks against the sides of the press block and whereby the press block can be located between the end blocks without removing the tie means.

15. The modular press block assembly of claim 14, including a plurality of said modular press blocks for positioning in a side-by-side relationship between the end blocks.

16. The modular press block assembly of claim 15 wherein said complementary interengaging key means are located on side faces of the modular press blocks.

17. The modular press block assembly of claim 16 wherein said complementary interengaging key means on the end blocks and the modular press blocks are of uniform configurations.

18. The modular press block assembly of claim 14, including a plurality of said modular press blocks of different sizes to form a set thereof for accommodating a plurality of different sized connector assemblies.

19. The modular press block assembly of claim 18 wherein said tie means are of sufficient length to accommodate a plurality of modular press blocks between the end blocks.

20. The modular press block assembly of claim 19, including at least one spacer block positionable between a pair of modular press blocks and including said complementary interengaging key means.

21. For use in a press tool for mounting an electrical connector assembly having a housing and depending terminal pins into a printed circuit board, the terminal pins having outwardly projecting shoulder means, a modular press block assembly comprising:

a pair of end holders; and at least one modular press block positioned between the end holders for engaging the connector assembly and pressing the terminals into the printed circuit board, the modular press block including through holes for receiving terminal ends of said terminal pins regardless of the length thereof, and the through holes being sized so that the press block abuts said shoulder means for pressing the terminal pins into the printed circuit board.

22. The modular press block assembly of claim 21, including a plurality of said modular press blocks for positioning in a side-by-side relationship between the end holders.

23. The modular press block assembly of claim 21, including a plurality of said modular press blocks of different sizes to form a set thereof for accommodating a plurality of different sized connector assemblies.

24. The modular press block assembly of claim 21 further comprising tie means extending from one end holder to the other end holder to hold each end holder against a press block, said tie means being of sufficient length to accommodate a plurality of modular press blocks between the end holders.

25. The modular press block assembly of claim 24, including at least one spacer block positionable between a pair of modular press blocks.

26. The modular press block assembly of claim 21 further comprising tie means extending from one end holder to the other end holder to hold each end holder against a press block, said tie means being located outside the bounds of the modular press block whereby the press block can be located between the end holders without removing the tie means.

27. For use in a press tool for mounting an electrical connector assembly having a housing and depending terminal pins into a printed circuit board, a modular press block assembly comprising:

a pair of end holders; and a plurality of modular press blocks of different sizes to form a set thereof for accommodating a plurality of different sized connector assemblies, the press blocks being positioned side-by-side between the end holders for engaging the connector assembly and pressing the terminals into the printed circuit board.

28. The modular press block assembly of claim 27, including at least one spacer block positionable between a pair of modular press blocks and including said complementary interengaging key means.

29. The modular press block assembly claims 27 further comprising tie means extending from one end holder to the other end holder to hold each end holder against a press block, said tie means being located outside the bound of the modular press block whereby the press block can be located between the end holders without removing the tie means.

* * * * *